Figure 1:
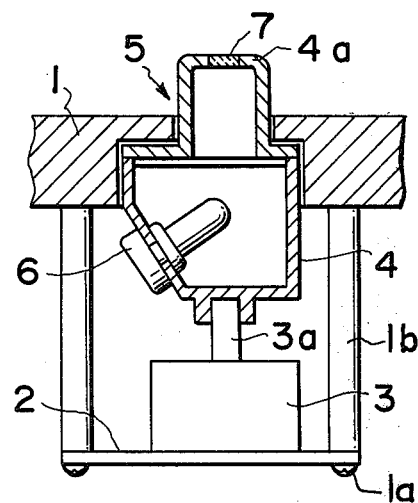

United States Patent [19]

Hara et al.

[11] 4,324,986
[45] Apr. 13, 1982

[54] SWITCH POSITION INDICATING MEANS FOR AUTOMOBILES

[75] Inventors: Takanori Hara; Makoto Yoshinaga; Haruto Yano; Noriyasu Matumura, all of Hiroshima, Japan

[73] Assignee: Toyo Kogyo Co., Ltd., Hiroshima, Japan

[21] Appl. No.: 191,848

[22] Filed: Sep. 29, 1980

[30] Foreign Application Priority Data

Sep. 29, 1979 [JP] Japan .................. 54-135469[U]

[51] Int. Cl.³ .............................................. B60Q 3/04
[52] U.S. Cl. ................................ 307/10 LS; 307/157; 315/77
[58] Field of Search ................. 37/10 LS, 157, 10 R; 315/77

[56] References Cited

U.S. PATENT DOCUMENTS 4,029,991 6/1977 Schultz .................. 307/10 LS X

FOREIGN PATENT DOCUMENTS 2037970 3/1971 Fed. Rep. of Germany ........ 315/77
2620786 11/1977 Fed. Rep. of Germany ........ 315/77

Primary Examiner—Michael L. Gellner
Assistant Examiner—James L. Dwyer
Attorney, Agent, or Firm—Fleit & Jacobson

[57] ABSTRACT

An automobile electric system including an electrically operated device such as an air conditioning device which is controlled by a control switch and light devices such as head lights which are controlled by a light switch. The control switch is provided with an illuminating lamp which is adapted to indicate the switch positions and the location of the switch. A control circuit for the illuminating lamp is provided so that the lamp illuminates the control switch when the switch is actuated, with a sufficient brightness in day time to show that the switch is actuated, but with a moderate brightness in night time wherein the light switch is actuated. Further, in night time, the control switch is illuminated with a weak light when the control switch is not actuated only to indicate the location of the control switch.

5 Claims, 2 Drawing Figures

SWITCH POSITION INDICATING MEANS FOR AUTOMOBILES

The present invention relates to switch position indicating means for automobiles.

In automobiles, there are provided various electrical switches for controlling air conditioners and other electric equipment. The switches are generally mounted on an instrument panel at the back side thereof by means of brackets and have actuating knobs projecting from the front side of the instrument panel so that the switches can be actuated from the front side of the instrument panel. In order that the locations and the actuated positions of the switches be readily recognized by a person in the automobile, there has already been proposed to provide means for illuminating the actuating knobs. For example, the switch actuating knob may be of a hollow structure and, in the actuating knob, there may be provided a lamp which is adapted to be energized when the switch is actuated. The lamp may also be used to indicate the location of the switch in night time.

However, in this type of indication, there are inconveniencies in that the brightness of the lamp must be high in order to provide a clear indication in day time but such high brightness of lamp may be dazzling to the driver in night time. Further, when it is intended to use the lamp for indicating the location of the switch in night time under an unactuated position of the switch, the brightness of the lamp must be appropriately controlled to distinguish the actuated position from the unactuated position.

It is therefore an object of the present invention to provide switch position indicating means in which intensity of illumination of the indicating lamp can be controlled in three different stages.

Another object of the present invention is to provide switch position indicating means which can indicate the actuated position of a switch with a sufficient brightness in day time but with a moderate brightness in night time, and the unactuated position with a weak brightness in night time.

According to the present invention, the above and other objects can be accomplished by an electric system for automobiles comprising electric power source means, electrically operated means providing a load on the power source means, control switch means disposed between the power source means and the electrically operated means for controlling an electric power supply from the power source means to the electrically operated means, said switch means having an unactuated position and at least one actuated position and provided with manually actuatable means, switch illuminating means disposed in the vicinity of the manually actuatable means to illuminate the same, electric circuit means for energizing the illuminating means, automobile light means adapted for use in dark conditions, light switch means provided between the power source means and the automobile light means for controlling an electric power supply from the power source means to the light means, first switch means connected with the switch illuminating means and being adapted to close the electric circuit means only when the control switch means is in the actuated position and the light switch means is not actuated, so as to energize the switch illuminating means, second switch means connected through a first resistance means with the switch illuminating means in parallel with the first switch means and being adapted to close the electric circuit means when the control switch means and the light switch means are actuated, so as to energize the switch illuminating means through the first resistance means, third switch means connected through a second resistance means which is of a resistance higher than that of the first resistance means with the switch illuminating means in parallel with the first and second switch means and being adapted to close the electric circuit means when the light switch means is actuated and the control switch means is not actuated so that the switch illuminating means is energized through the second resistance means.

According to the present invention, when the control switch means is actuated to operate the electrically operated means such as an air conditioning device in day time, the switch illuminating means is energized through the electric circuit means which is of the lowest resistance value at this moment since the light switch is in the unactuated position. Thus, the manually actuatable means of the control switch means is illuminated with a sufficient brightness to indicate that the control switch means is in the actuated position. In night time, the light switch means is actuated so that the switch illuminating means is energized through the second resistance means which is of a higher resistance value. Therefore, the manually actuatable means of the control switch means is illuminated with a smallest brightness to indicate the location thereof. When the control switch means is actuated, the second switch means is actuated to energize the switch illuminating means through the first resistance means which is of a lower resistance value so that the manually actuatable means of the control switch means is illuminated with a moderate brightness to show that the control switch means is in the actuated position.

Figure 2:
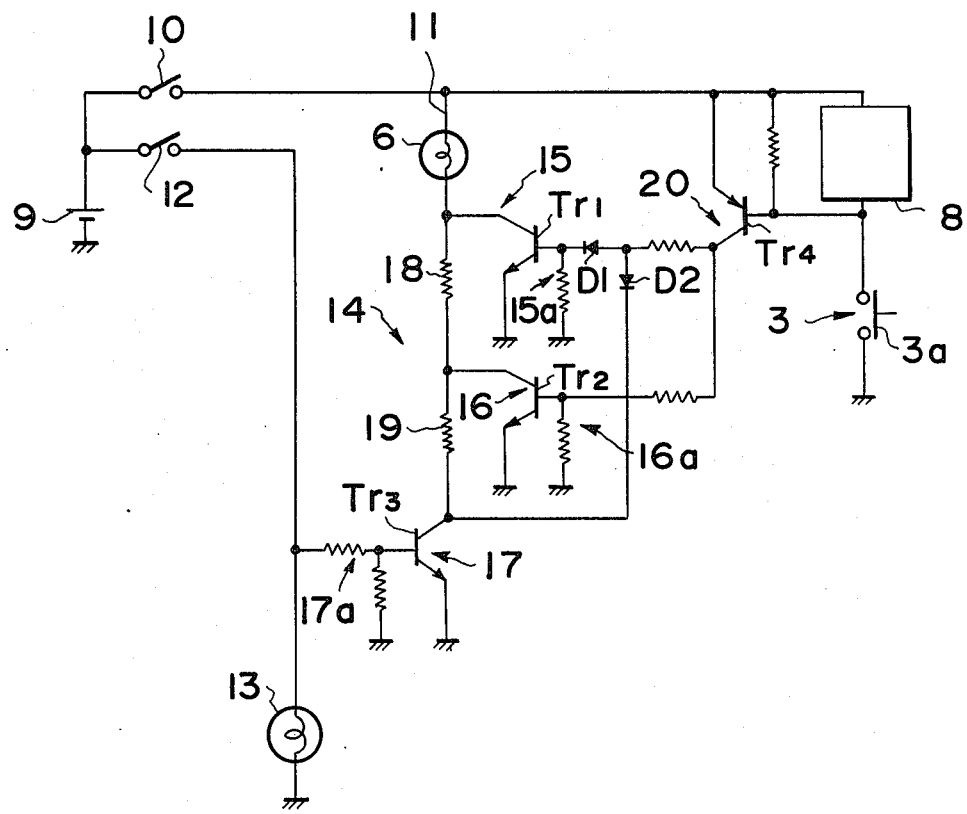

The above and other objects and features of the present invention will become apparent from the following descriptions of a preferred embodiment taking reference to the accompanying drawings, in which:

FIG. 1 is a sectional view of a control switch to which the present invention can be applied; and, FIG. 2 is a circuit diagram of the electric system in accordance with one embodiment of the present invention.

Referring now to the drawings, particularly to FIG. 1, there is fragmentarily shown an instrument panel 1 which has a switch bracket 2 attached to the backside thereof by means of screws 1a and spacers 1b. On the switch bracket 2, there is mounted a control switch assembly 5 which includes a control switch 3 having an actuating member 3a. The switch 3 is of such a type that the switch position is alternately changed between an actuated or closed position and an unactuated or open position each time when the actuating member 3a is pushed. The actuating member 3 is attached with an actuating button 4 which has a projection 4a projecting from the front side of the instrument panel 1. The button 4 is of a hollow structure and an illuminating lamp 6 is disposed in the button. The projection 4a of the button 4 is provided at the top surface with a transparent portion 7 so that the illumination of the lamp 6 can be observed at the outside of the button 4.

Referring now to FIG. 2, there is shown an electric circuit including the switch 3 and the lamp 6. The circuit includes an electric power source 9 which is connected through a main switch with an electrically operated device 8 which is in turn grounded through the control switch 3. Thus, when the main switch 10 is closed, the device 8 can be controlled by the switch 3. In parallel with the main switch 10, there is a light switch 12 which leads to a lighting system 13. The illuminating lamp 6 is connected on one hand with the main switch 10 through a line 11 and on the other hand grounded through a switching circuit 14.

The switching circuit 14 includes a first switch 15 comprised of an NPN type transistor Tr1 having a collector directly connected with the lamp 6. The emitter of the transistor Tr1 is grounded. There is also provided a second switch 16 comprised of an NPN type transistor Tr2 having a collector connected with the lamp 6 through a first resistor 18, the emitter of the transistor Tr2 being grounded. The switching circuit 14 further includes a third switch 17 comprised of an NPN type transistor Tr3 which has a collector connected with the lamp 6 through the resistor 18 and a second resistor 19 which is in series with the first resistor 18. The emitter of the transistor Tr3 is grounded and the base is connected with the light switch 12 through a voltage divider 17a.

In order to control the transistors Tr1, Tr2 and Tr3, there is provided an auxiliary switch 20 comprised of a PNP type transistor Tr4 having an emitter connected with the main switch 10 and a base connected with the switch 3. The collector of the transistor Tr4 is connected through a voltage divider 15a having a diode D1 with the base of the transistor Tr1. Further, the collector of the transistor Tr4 is connected through a voltage divider 16a with the base of the transistor Tr2. The collector of the transistor Tr3 is connected with the voltage divider 15a through a diode D2.

It will therefore be understood that, when the control switch 3 is closed, the transistor Tr4 of the auxiliary switch 20 becomes conductive so that the transistor Tr1 of the first switch 15 is turned on if the transistor Tr3 of the third switch is non-conductive. In day time, the light switch 12 is opened and the transistor Tr3 is therefore non-conductive, so that the lamp 6 is energized through the transistor Tr1 when the control switch 3 is closed to thereby illuminate the button 4 with a sufficiently high brightness. Thus, it is indicated that the device 8 is turned on.

In night time, the switch 12 is closed to turn on the lighting system 13. This will cause the transistor Tr3 of the third switch 17 to become conductive. When the control switch 3 is opened, the transistors Tr1 and Tr2 are non-conductive so that the lamp 6 is energized through the resistors 18 and 19. Thus, the actuating button 4 is illuminated with a low brightness only to indicate the location of the button 4. In this position, when the switch 3 is closed, the transistor Tr4 of the auxiliary switch becomes conductive so that the transistor Tr2 of the second switch 16 is turned on. However, since the base of the transistor Tr1 is grounded through the diode D2 and the transistor Tr3, the transistor Tr1 stays non-conductive. It will therefore be understood that the lamp 6 is energized only through the resistor 18. Thus, the button 4 is illuminated with a moderate brightness to show that the device 8 is in operation.

The invention has thus been shown and described with reference to a specific arrangement, however, it should be noted that the invention is in no way limited to the details of the illustrated arrangement but changes and modifications may be made without departing from the scope of the appended claims. For example, the control switch may not necessarily be of a push-button type but any other types of switches may be used. Further, the illuminating lamp may not necessarily be placed in the manually actuatable member such as the push-button but may be placed outside such member to illuminate the same. The transistors in the circuit may be substituted by other equivalent elements such as relays or the like.

We claim:

1. An electric system for automobiles comprising electric power source means, electrically operated means providing a load on the power source means, control switch means disposed between the power source means and the electrically operated means for controlling an electric power supply from the power source means to the electrically operated means, said switch means having an unactuated position and at least one actuated position and provided with manually actuatable means, switch illuminating means disposed in the vicinity of the manually actuatable means to illuminate the same, electric circuit means for energizing the illumination means, automobile light means adapted for use in dark conditions, light switch means provided between the power source means and the automobile light means for controlling an electric power supply from the power source means to the light means, first switch means connected with the switch illuminating means and being adapted to close the electric circuit means only when the control switch means is in the actuated position and the light switch means is not actuated, so as to energize the switch illuminating means, second switch means connected through a first resistance means with the switch illuminating means in parallel with the first switch means and being adapted to close the electric circuit means when the control switch means and the light switch means are actuated, so as to energize the switch illuminating means through the first resistance means, third switch means connected through a second resistance means which is of a resistance higher than that of the first resistance means with the switch illuminating means in parallel with the first and second switch means and being adapted to close the electric circuit means when the light switch means is actuated and the control switch means is not actuated so that the switch illuminating means is energized through the second resistance means.

2. An electric system in accordance with claim 1 in which said first switch means is connected with the third switch means so that the former is moved to a position wherein it opens the electric circuit means when the latter is moved to a position wherein it closes the electric circuit means.

3. An electric system in accordance with claim 1 in which said first, second and third switch means include switching transistors.

4. An electric system in accordance with claim 1 in which a further switching transistor is provided for controlling the switching transistors in the first and second switching means, said further switching transistor being connected with the control switch means so that it is switched in accordance with the position of the control switch means.

5. An electric system in accordance with claim 1 in which said electrically operated means is an air conditioning device.

* * * * *